United States Patent [19]

Wefer

[11] Patent Number: 4,485,212

[45] Date of Patent: Nov. 27, 1984

[54] IMPACT RESISTANT BLEND OF POLYBUTYLENE TEREPHTHALATE RESIN AND OSA GRAFT COPOLYMER

[75] Inventor: John M. Wefer, Newtown, Conn.

[73] Assignee: Uniroyal, Inc., Middlebury, Conn.

[21] Appl. No.: 498,613

[22] Filed: May 27, 1983

[51] Int. Cl.³ .............................................. C08L 67/02
[52] U.S. Cl. ...................................... 525/64; 525/289; 525/313
[58] Field of Search .......................................... 525/64

[56] References Cited

U.S. PATENT DOCUMENTS 3,864,428 2/1975 Nakamura .............................. 525/67
3,919,353 11/1975 Castelnuovo ........................... 525/69
4,022,748 5/1977 Schlichting ............................. 524/80
4,202,948 5/1980 Perscoe ................................... 525/70
4,260,690 4/1981 Binsack .................................. 525/64
4,292,233 9/1981 Binsack .................................. 525/69

Primary Examiner—John C. Bleutge
Assistant Examiner—Patricia Short
Attorney, Agent, or Firm—John A. Shedden; James J. Long

[57] ABSTRACT

Blend of polybutylene terephthalate resin and a graft copolymer of styrene and acrylonitrile on olefin copolymer rubber (e.g., EPDM) has high impact strength, provided the blend contains at least 25% of the graft.

7 Claims, No Drawings

IMPACT RESISTANT BLEND OF POLYBUTYLENE TEREPHTHALATE RESIN AND OSA GRAFT COPOLYMER

This invention relates to an impact resistant blend of polybutylene terephthalate (PBT) resin and a graft copolymer of styrene and acrylonitrile on olefin copolymer rubber (OSA).

My copending application Ser. No. 423,397, filed Sept. 24, 1982, discloses high impact three-component blends of (a) polyester resin, (b) polycarbonate resin, and (c) graft copolymer of EPDM type rubber with at least one polar monomer. The present invention is based on the discovery that certain two-component blends consisting essentially of polybutylene terephthalate resin and olefin copolymer graft provide high impact strength along with other desirable properties in an economical manner.

U.S. Pat. No. 3,919,353, Castelnuovo et al., Nov. 11, 1975, discloses impact resistant blends of polyester and rubber-resin graft copolymers. EPDM grafted with common ethylenically unsaturated monomers is disclosed although polybutadiene is the preferred elastomer and all examples use MBS (polybutadiene grafted with styrene-methyl methacrylate). The elastomer is crosslinked. Twenty-two out of twenty-three examples employ polyethylene terephthalate (PET, which is outside the scope of this invention.) In the example (No. 23) employing polybutylene terephthalate (PBT) the notched impact is only 2.8 ft-lb/in (15 kg-cm/cm). The modifier level (i.e., the grafted elastomer) is 3-30%.

U.S. Pat. No. 4,260,690, Binsack et al., Apr. 7, 1981, discloses a blend of polyester and melt-polymerized rubber-resin graft, including ethylene/propylene rubber grafted with various monomers. Binsack et al do not distinguish among the various graft monomers that are shown, and the notched impact strengths of the blends given in the examples are relatively low (3.0-4.5 $kJ/m^2 = 0.7-1.1$ ft-lb/in). These materials have notched impacts at best only slightly higher than that of unmodified PBT (0.6 ft-lb) and clearly point away from the very high impact obtained in the present invention with styrene-acrylonitrile graft. Binsack et al discloses 1-30% grafted monomers in the modifier and up to 40% total modifier (graft copolymer) in the final blend. The present invention, in contrast, is directed to the use of 35-60% styrene-acrylonitrile in the graft and 25-55% modifier (graft) level in the final blend.

U.S. Pat. No. 4,172,859, Epstein, Oct. 30, 1979, discloses blends of polybutylene terephthalate, polycarbonate resin and an impact modifier. The impact modifier comprises various monomers, combinations of which can include EPDM.

Various other blends based on polyester resin, polycarbonate resin, or graft copolymer rubber-resin materials have also been proposed (e.g., U.S. Pat. Nos. 3,591,659; 4,022,748; 4,034,013; 4,034,016; 4,044,073; 4,096,202; 4,257,937; and 4,280,949).

In accordance with the present invention high impact blends are prepared by mixing polybutylene terephthalate resin with 25% or more of an olefin rubber graft copolymer. Addition of less than 25% graft affords no significant impact improvement.

In my previously mentioned copending application Ser. No. 423,397, directed to high impact blends of polybutylene terephthalate, polycarbonate, and grafted EPDM, high impact is achieved at lower elastomer (EPDM graft) levels than in the present two-component blends. Comparing the two systems, high impact two-component blends of the invention tend to be somewhat softer but nevertheless have a highly useful balance of properties and are remarkably economical.

The polybutylene terephthalate component of the blend of the invention is thermoplastic resinous poly(1,4-butylene terephthalate) and is described for example in U.S. Pat. Nos. 2,465,319; 3,047,539; 4,257,937 and 4,280,949.

The graft copolymer component of the composition of the invention is termed OSA and is based on an olefin copolymer rubber spine, usually a copolymer of ethylene and propylene (EPR), whether a binary copolymer containing only ethylene and propylene (saturated EPM) or a copolymer of ethylene and propylene and another monomer, as in such unsaturated terpolymers as ethylene-propylene-non-conjugated diene terpolymers (EPDM, wherein ethylidene norbornene, dicyclopentadiene and hexadiene are examples of the third monomer), or terpolymers containing other monomers such as phenyl norbornene.

The graft copolymer is made by graft copolymerizing styrene and acrylonitrile on the olefin copolymer rubber spine in accordance with conventional practice as described for example in U.S. Pat. No. 4,202,948, Peascoe, May 13, 1980, or by the extrusion mass grafting method described in application Ser. No. 441,122 of Paul D. Andersen, filed Nov. 12, 1982. For purposes of the invention the amount of styrene and acrylonitrile in the graft copolymer ranges from 35 to 60% by weight, based on the total weight of monomers plus rubber spine. The ratio of styrene to acrylonitrile may range from 90:10 to 60:40, by weight.

It will be understood that in practice the product of the graft copolymerization process is actually a mixture of true graft of resin on rubber along with a certain amount of separate, ungrafted resin (that is, the grafting efficiency is not 100%). If desired, additional separately prepared styrene-acrylonitrile resin may be added to the graft copolymer composition.

To prepare the blends of the invention the polybutylene terephthalate resin and the graft copolymer are mixed together at elevated temperature in conventional plastics mixing equipment, such as a twin screw extruder-mixer.

One desirable mixing procedure is a two-step compounding process involving first working the graft copolymer without the polybutylene terephthalate, under shearing and fluxing conditions, for example in a twin screw extruder-mixer. This disperses the olefin copolymer rubber within the resin contained in the graft copolymer composition, to form an "inverted" composition in which the olefin copolymer rubber is the discontinuous phase. The second step involves fluxing the inverted graft component with the polybutylene terephthalate component under lower shear conditions, for example in a single screw extruder.

In commercial practice the foregoing two steps can be combined in one extrusion operation, using an extruder having a first and second feed port. A section of the extruder downstream of the first feedport can be used to shear (invert) the graft copolymer and a section downstream of the second feedport can be used to mix the graft with the polybutylene terephthalate.

The inverted graft composition may also be pelletized and tumble blended with polybutylene terephthalate pellets to form a physical mixture which can be fed into an injection molding machine or an extruder. In this case the plasticizing screw of the injection or extrusion machine can perform the second stage of the mixing during fabrication.

The table below shows the composition and properties of a number of blends of the invention. For comparison, a number of blends outside the scope of the invention are also shown. Composition 1 is a control containing no graft copolymer. Blends 2-6 use a graft copolymer of styrene and acrylonitrile on EPDM as the modifier; of these only blends 4, 5 and 6, containing 30% or more of modifier, come within the invention. Blends 2 and 3, containing smaller amounts of graft copolymer, have poor impact strength and are outside the invention. Comparison blends 7-11 contain a graft copolymer of styrene and methyl methacrylate on EPDM; all of these fail to achieve high impact strength regardless of the level of modifier. Likewise, comparison blends 12-15 containing a graft copolymer of methyl methacrylate on EPDM have poor impact strength at all graft levels tested.

The graft copolymer used in blends 2-6 is a graft of 50 parts of styrene-acrylonitrile (72:28 ratio) on 50 parts of an EPDM based on ethylidene norbornene; E/P ratio 60/40; iodine number 20; ML-4 68 at 125° C.

The graft copolymer used in blends 7-11 is a graft of 50 parts of styrene-methyl methacrylate (50:50 ratio) on 50 parts of the same EPDM as previously described.

The graft copolymer used in blends 12-15 is a graft of 50 parts of methyl methacrylate on 50 parts of the same EPDM.

The table indicates the amounts, in parts by weight, of the various grafts and of polybutylene terephthalate resin (PBT), which is a commercial material (Valox 310; trademark), employed in making the blends, which were mixed in accordance with the two-stage procedure described above. The grafts were first fluxed in a 53 mm Werner and Pfleiderer twin-screw extruder mixer equipped with a strand die and pelletizer. The pelletized grafts were the fluxed with the PBT in a one inch single screw extruder. Specimens for mechanical property testing were cut from ⅛ inch injection molded plaques.

In the table, NIRT indicates the notched Izod impact strength in foot pounds per inch of notch, at room temperature. NI −20° F. incidates the notched Izod impact strength at −20° F. Rockwell-R indicates the hardness.

The data in the table indicate that the styrene-acrylonitrile graft (S/ACN) is specific in producing very high impact strength in blends where PBT is the only other component. The other EPDM grafts, namely styrene/methyl methacrylate (S/MMA) and methyl methacrylate (MMA) are effective (in the absence of a polycarbonate resin).

What is claimed is:

1. An impact resistant blend comprising a mixture of
   (A) poly(1,4-butylene terephthalate) resin, and
   (B) a graft copolymer of (a) styrene and acrylonitrile on (b) an ethylene-propylene-non-conjugated diene terpolymer rubber spine,
   the amount of (B) being from 25 to 55% by weight based on the total weight of (A) and (B), the amount of (a) in the graft copolymer being from 35 to 60% by weight based on the weight of (a) plus (b), and the ratio of styrene to acrylonitrile being in the range from 90:10 to 60:40 by weight, the said graft copolymer (B) being an inverted composition in which the rubber (b) is a discontinuous phase.

2. An impact resistant blend comprising a mixture of
   (A) poly(1,4-butylene terephthalate) resin, and
   (B) a graft copolymer of (a) styrene and acrylonitrile on (b) an ethylene-propylene-non-conjugated diene terpolymer rubber spine,
   the amount of (B) being from 25 to 55% by weight based on the total weight of (A) and (B), the amount of (a) in the graft copolymer being from 35 to 60% by weight based on the weight of (a) plus (b), and the ratio of styrene to acrylonitrile being in the range from 90:10 to 60:40 by weight, the said graft copolymer (B) having been first worked under shearing and fluxing conditions in the absence of (A) to form an inverted composition in which (b) is a discontinuous phase, prior to blending with (A).

3. An impact resistant blend as in claim 2 in which the amount of (a) in the graft copolymer is 50% by weight based on the weight of (a) plus (b).

4. An impact resistant blend as in claim 3 in which the styrene to acrylonitrile ratio is 72:28, by weight.

5. A method of making an impact resistant blend comprising a mixture of
   (A) poly(1,4-butylene terephthalate) resin, and
   (B) a graft copolymer of (a) styrene and acrylonitrile on (b) an ethylene-propylene-non-conjugated diene terpolymer rubber spine,
   the amount of (B) being from 25 to 55% by weight based on the total weight of (A) and (B), the amount of (a) in the graft copolymer being from 35 to 60% by weight based on the weight of (a) plus (b), and the ratio of styrene to acrylonitrile being in the range from 90:10 to 60:40 by weight, in which method the graft copolymer (B) is first worked under shearing and fluxing conditions in the absence of (A) to form an inverted composition in which (b) is a discontinuous phase, prior to blending with (A).

6. A method as in claim 5 in which the amount of (a) in the graft copolymer is 50% by weight based on the weight of (a) plus (b).

7. A method as in claim 6 in which the styrene to acrylonitrile ratio is 72:28, by weight.

| | IMPACT MODIFIED PBT | | | | | | | | | | | | | | |
|---|---|---|---|---|---|---|---|---|---|---|---|---|---|---|---|
| | 1 | 2 | 3 | 4 | 5 | 6 | 7 | 8 | 9 | 10 | 11 | 12 | 13 | 14 | 15 |
| GRAFT | | | | | | | | | | | | | | | |
| S/ACN | | 10 | 20 | 30 | 40 | 50 | | | | | | | | | |
| S/MMA | | | | | | | 10 | 20 | 30 | 40 | 50 | | | | |
| MMA | | | | | | | | | | | | 20 | 30 | 40 | 50 |
| PBT | 100 | 90 | 80 | 70 | 60 | 50 | 90 | 80 | 70 | 60 | 50 | 80 | 70 | 60 | 50 |
| NIRT | 0.6 | 1.3 | 1.9 | 16.7 | 19.3 | 19.2 | 0.9 | 0.9 | 1.2 | 1.3 | 1.4 | 1.0 | 1.2 | 1.5 | 2.3 |
| NI −20° F. | 0.4 | 0.7 | 0.8 | 1.0 | 1.6 | 1.7 | 0.5 | 0.7 | 0.6 | 0.7 | 0.7 | 0.7 | 0.7 | 0.6 | 0.8 |
| Rockwell-R | 119 | 113 | 108 | 96 | 87 | 70 | 116 | 107 | 93 | 78 | 63 | 108 | 95 | 84 | 69 |

* * * * *